UNITED STATES PATENT OFFICE.

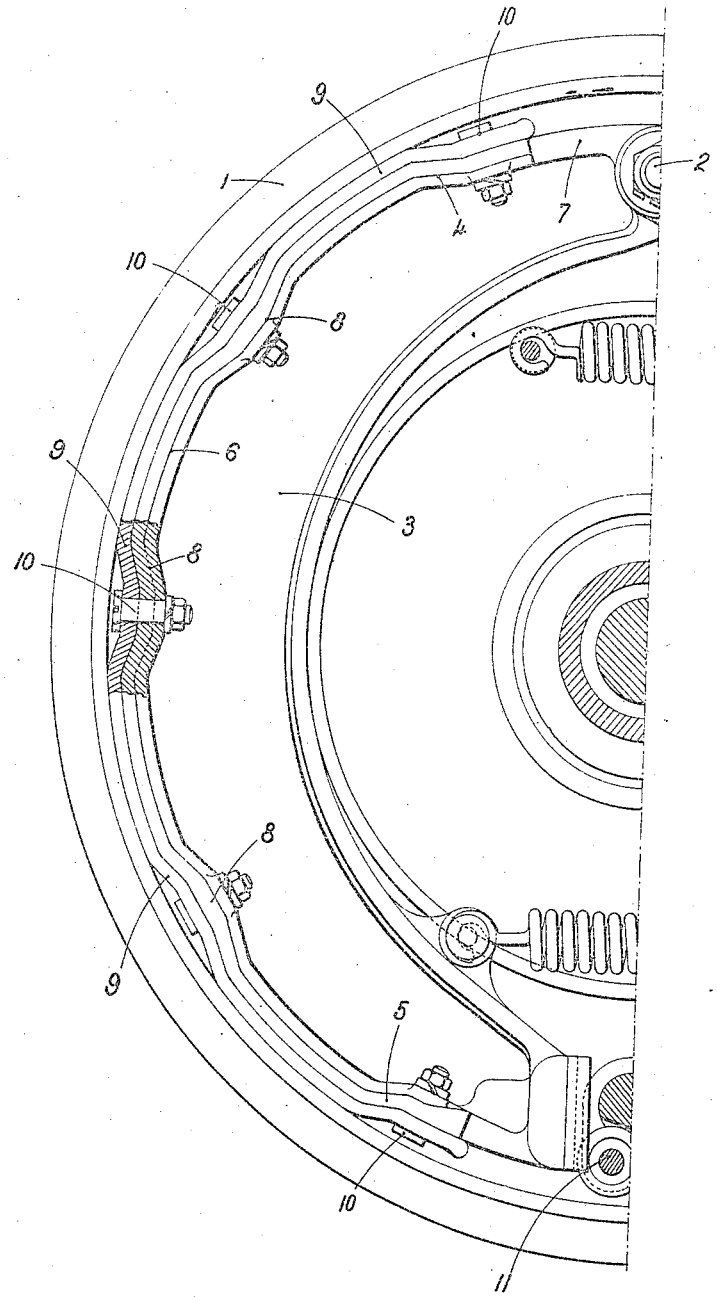

ROBERT DELAUNAY-BELLEVILLE, OF ST. DENIS, FRANCE, ASSIGNOR TO SOCIETE ANONYME DES AUTOMOBILES DELAUNAY-BELLEVILLE, OF ST. DENIS, FRANCE.

FRICTION-BRAKE.

1,111,058.     Specification of Letters Patent.     Patented Sept. 22, 1914.

Application filed June 30, 1913. Serial No. 776,661.

*To all whom it may concern:*

Be it known that I, ROBERT DELAUNAY-BELLEVILLE, citizen of the French Republic, residing at St. Denis, Department of the Seine, in France, have invented certain new and useful Improvements in Friction-Brakes; and I do hereby declare the following to be a full, clear, and exact description of the invention, such as will enable others skilled in the art to which it appertains to make and use the same.

Friction brakes in which there are two segments pivoted about an axis and caused to bear against the inner wall or a brake drum by appropriate means separating them from each other, generally wear out rapidly and become grooved. The friction between the segments and the drum takes place through a lining of woven asbestos, camel hair and so forth, secured to the outside of the segments whereon it is retained by means of rivets so that the whole of its surface bears against the drum. The wear of the lining resulting from friction soon causes the heads of the rivets to emerge, which, when the brake is applied, groove the drum and thus weaken it. Moreover, the ends of the lining, in particular that which first comes into contact with the drum when the brake is applied, are liable to be torn off.

This invention has for its object the elimination of these drawbacks by means of a device which effectively prevents the drum from coming into contact with the means whereby the lining is secured but which still insures a better tension of the latter and protects its ends from the danger of being torn off.

The accompanying drawing shows, by way of example, one half of a brake, the segments of which embody the invention.

Within the cylindrical brake drum 1 there are segments or shoes 3 pivoted on an axle 2 and adapted to be forced against the interior of the drum 1. However, instead of forming a continuous cylindrical surface as in the ordinary segments, the external peripheries of the segments 3 are formed with a plurality of sinuous recesses the number of such depressions being usually an odd one. At both the pivoted as well as at the operative end, simple inclined surfaces 4 and 5 join the external faces 6 of maximum diameter of the segment to the surface 7 of minimum diameter. Between these extreme depressions of the external surface of the segment there is an odd number of cavities 8 having on each side inclined faces connecting it with the periphery of maximum diameter. The lining 9 made of any appropriate material is extended over this sinuous surface and is retained thereon by means of bolts and nuts 10. The depressions 4 and 5 and the cavities 8 are made sufficiently deep to keep the heads of the bolts 10 at a certain distance from the inner face of the brake drum 1, a distance which is greater than the maximum wear of the lining 9. To put this lining in place, the following method which is of great importance as regards the distribution of the tension is employed: First of all the lining is stretched between the extreme bolts 10, that is to say between that nearest to the pivot and that nearest to the device 11 separating the segments. It is thus simply, depressed on the inclined faces 4 and 5 but between the latter it forms a perfectly cylindrical surface uniformly stretched. The bolts located in the center of the segment are then put in place and tightened so as to cause the lining 9 to penetrate in the central cavity 8. Thus the lining is divided into two halves equally stretched for this reason it is advantageous to have an odd number of cavities 8. Each of the two halves is then stretched in the same manner by placing the bolts in the intermediate cavity and depressing the lining within the corresponding cavities taking each part of the lining at its mid-point. This method of assembling thus distributes the tension uniformly over the whole of the lining.

It follows from the arrangements described that the heads of the bolts 10 can never come into contact with the brake drum causing neither wearing away nor grooving. Moreover, owing to the depression at the ends of the segment, contact between the lining and the drum begins on a part of the lining extended between two bolts on one of the bosses of the segment, but the end of the lining which is in a depression and is not capable of being utilized as a first point of contact, is protected from the danger of being torn off.

I claim:

1. A friction brake comprising a brake drum, a shoe coöperating therewith provided with an odd number of depressions, a brake lining on said shoe, and fastening devices for securing the lining to the shoe at said depressions.

2. A friction brake comprising a brake drum, a shoe coöperating therewith, a brake lining on said shoe, said shoe provided with a central depression, and a depression disposed at either side thereof whereby the lining may be secured to the shoe at said depressions and placed under uniform tension throughout its length by first securing the lining at the end depressions and then at the central depression.

In testimony whereof I affix my signature, in presence of two witnesses.

ROBERT DELAUNAY-BELLEVILLE.

Witnesses:
 EMILE KLOTZ,
 HANSON C. COXE.